US011960746B2

(12) United States Patent
Talukdar et al.

(10) Patent No.: US 11,960,746 B2
(45) Date of Patent: Apr. 16, 2024

(54) STORAGE CONTEXT AWARE TIERING POLICY ADVISOR

(71) Applicant: Dell Products, L.P., Round Rock, TX (US)

(72) Inventors: Rohit Talukdar, Bangalore (IN); Rekha Ms, Bangalore (IN); Joji John, Bangalore (IN); Pradyot Mishra, Bangalore (IN)

(73) Assignee: DELL PRODUCTS, L.P., Round Rock, TX (US)

( * ) Notice: Subject to any disclaimer, the term of this patent is extended or adjusted under 35 U.S.C. 154(b) by 39 days.

(21) Appl. No.: 17/583,275

(22) Filed: Jan. 25, 2022

(65) Prior Publication Data
US 2023/0236751 A1  Jul. 27, 2023

(51) Int. Cl.
*G06F 3/06* (2006.01)
*G06N 20/00* (2019.01)

(52) U.S. Cl.
CPC .......... *G06F 3/0646* (2013.01); *G06F 3/0605* (2013.01); *G06F 3/067* (2013.01); *G06N 20/00* (2019.01)

(58) Field of Classification Search
None
See application file for complete search history.

(56) References Cited

U.S. PATENT DOCUMENTS

| | | | | |
|---|---|---|---|---|
| 8,924,359 B1* | 12/2014 | Pendharkar | ........... | G06F 3/0608 |
| | | | | 707/672 |
| 9,507,887 B1* | 11/2016 | Wang | ..................... | G06F 3/0685 |
| 10,048,885 B1* | 8/2018 | Bono | ..................... | G06F 3/0605 |
| 10,225,162 B1* | 3/2019 | Jain | ..................... | H04L 67/1097 |
| 10,339,455 B1* | 7/2019 | Parush-Tzur | ........... | G06F 3/061 |
| 11,354,061 B2* | 6/2022 | Prado | ..................... | G06F 3/0611 |
| 2020/0133498 A1* | 4/2020 | Christensen | ............ | G06F 3/067 |
| 2021/0240347 A1* | 8/2021 | Lee | ......................... | G06F 3/0649 |
| 2022/0239567 A1* | 7/2022 | Manuel-Devadoss | | ...................... |
| | | | | H04L 63/0421 |

* cited by examiner

*Primary Examiner* — Stephanie Wu
(74) *Attorney, Agent, or Firm* — Amin, Turocy & Watson, LLP

(57) ABSTRACT

Technology described herein can be employed to automatically recommend a tiering policy for data storage of data at a data storage system, such as a cloud storage system. An example method can comprise determining, by a system comprising a processor, context information defining a data storage attribute applicable to data at a cloud storage system. The method can comprise, in response to determining the context information, generating, by the system, a tiering policy defining an element of tiering storage of data at the cloud storage system, wherein the tiering policy is based on the data storage attribute defined by the context information. The method also can comprise, in response to generating the tiering policy, outputting, by the system, the tiering policy to a storage device associated with a customer. The analysis can be performed using an artificial intelligence process, machine learning process or a combination thereof.

18 Claims, 10 Drawing Sheets

| Storage Context 302 | Tiering Policy 340 |
|---|---|
| FileSystem:{{File size = 10 GB, Last Accessed time= 1st Jan 2021, modified time = 3rd March 2021, Last attribute changed time = 2nd Feb 2021},...},<br>Used Space : 250GB,<br>Total Capacity : 300GB etc.,<br>Workload : Database | Policy: {compression": "none" , size < 4 MB, Last Accessed Time = 1st Jan 2021, encryption = true, modified time = 3rd March 2021, Last attribute changed time = 2nd Feb 2021} |

FIG. 3

STORAGE CONTEXT AWARE TIERING POLICY ADVISOR

BACKGROUND

Storage devices and/or systems can exist locally, in the cloud and/or as a hybrid model, relative to a customer/client. Control of data storage at these storage devices, such as server node systems, can be managed by one or more administrator devices that can employ one or more tiering policies for the data storage. Data at the respective storage device can thereby be stored, maintained, retained, accessed and/or organized according to the one or more tiering policies.

SUMMARY

The following presents a simplified summary of the disclosed subject matter to provide a basic understanding of one or more of the various embodiments described herein. This summary is not an extensive overview of the various embodiments. It is intended neither to identify key or critical elements of the various embodiments nor to delineate the scope of the various embodiments. Its sole purpose is to present one or more concepts of the disclosure in a streamlined form as a prelude to the more detailed description that is presented later.

An example method can comprise example method can comprise determining, by a system comprising a processor, context information defining a data storage attribute applicable to data at a cloud storage system. The method can comprise, in response to determining the context information, generating, by the system, a tiering policy defining an element of tiering storage of data at the cloud storage system, wherein the tiering policy is based on the data storage attribute defined by the context information. The method also can comprise, in response to generating the tiering policy, outputting, by the system, the tiering policy to a storage device associated with a customer.

An example system can comprise a processor, and a memory that stores executable instructions that, when executed by the processor, facilitate performance of operations. The operations can comprise analyzing, using an artificial intelligence process, machine-learning process, or a combination thereof, context information associated with different historical workloads of a cloud storage system, applying, using the artificial intelligence process, weights to the context information, resulting in weighted context information, wherein the weights are associated with data storage attributes of data of the cloud storage system, and based on the weighted context information, generating and outputting a tiering policy applicable to the cloud storage system.

An example non-transitory computer-readable medium can comprise executable instructions that, when executed by a processor, can facilitate performance of operations. The operations can comprise based on context information comprising data storage attributes that define tiering storage of data at a data storage system, generating a tiering policy. The operations also can comprise, in response to the generating the tiering policy, submitting the tiering policy for a first review by a user of the cloud storage system comprising sending the tiering policy to a user device associated with the user to solicit first user input comprising first feedback on the tiering policy. The operations further can comprise, in response to submitting the tiering policy for review, obtaining the first feedback on the tiering policy, and based on the first feedback on the tiering policy, adjusting the tiering policy resulting in an adjusted tiering policy. The operations additionally can comprise, in response to the adjusting the tiering policy, submitting the adjusted tiering policy for a second review by the user of the cloud storage system comprising sending the adjusted tiering policy to the user device associated with the user to solicit second user input comprising second feedback on the tiering policy.

BRIEF DESCRIPTION OF THE DRAWINGS

The technology described herein is illustrated by way of example and not limited in the accompanying figures in which like reference numerals indicate similar elements.

FIG. 3 illustrates exemplary storage data attributes and corresponding tiering policy, in accordance with one or more embodiments and/or implementations described herein.

DETAILED DESCRIPTION

Overview

Figure 1:
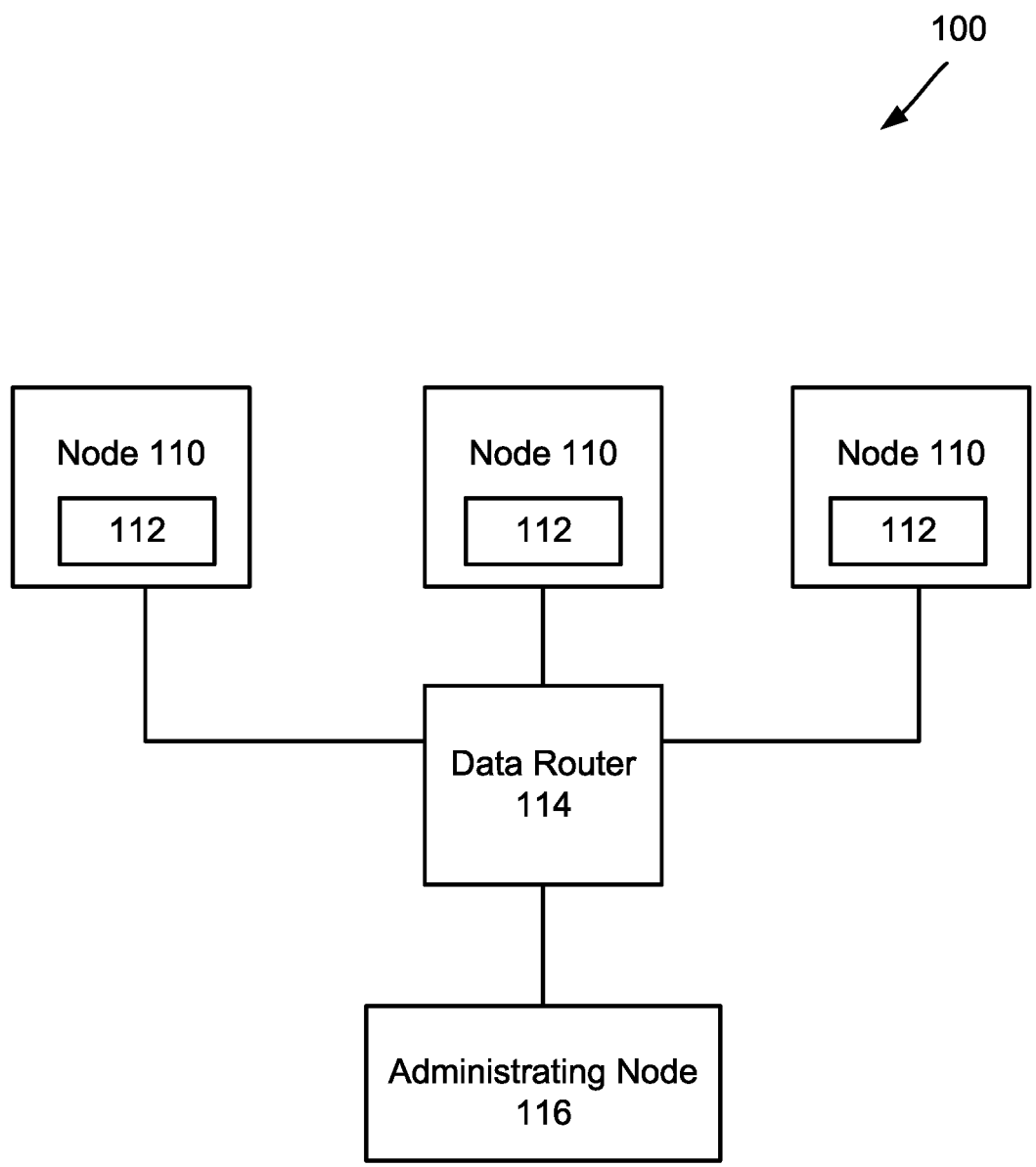
FIG. 1 illustrates a block diagram of a cloud storage system employing a tiering policy advising system, in accordance with one or more embodiments and/or implementations described herein.

The technology described herein is generally directed towards an efficient process to set a tiering policy for a data storage system, such as a cloud data storage system.

As used herein, data tiering refers to the movement of data between different storage tiers, which can allow for organization, maintenance, access and/or retention of the data. The data tiering further can enable appropriate data to be stored at and/or accessed by respective storage and/or application technology (e.g., hardware and/or software), such as one or more computers, servers and/or the like. Maintenance of security protocols can include validating, generating and/or analyzing tokens, such as security tokens, bearer tokens and/or the like. These operations can be executed for each node (e.g., each server) of a server system, and in one or more cases, can be executed frequently. One or more embodiments of devices, systems, methods and/or non-transitory machine-readable mediums will be described herein that can provide one or more advantages while addressing the one or more deficiencies of existing techniques of existing cloud provisioning.

Existing technology for determining a tiering policy are based upon manually reviewing user preferences for data storage attributes and manually determining therefrom a tiering policy for a data storage system. Associated with such manual review and manual generation of a tiering policy is insufficient understanding and/or experience with data, application behavior and/or compliance protocols. Also associated with the existing techniques is lack of data and/or information regarding how to determine and/or generate a tiering policy.

The one or more embodiments described herein can provide an automated process for setting a tiering policy for data storage at a data storage system, such as a cloud storage system. The one or more embodiments described herein can account for one or more deficiencies of existing techniques for tiering policy generation.

Generally, a system, method and/or non-transitory computer storage medium described herein can identify and analyze context information associated with data storage, generate a tiering policy, and amend/adjust the tiering policy in response to user feedback. As used herein, a user can be a customer, client, administrating entity and/or other entity. As used herein, the terms "customer" and "client" can be used interchangeably. The one or more embodiments described herein can provide automatic tiering policy setting and adjustment and can reduce errors introduced by manual, time-consuming and/or labor-intensive existing tiering policy generation processes. Reduced back-and-forth between the data storage system and customer can be facilitated.

Generally, a tiering policy advising system described herein can employ a model, such as an artificial intelligence model and/or machine learning model (which can be a deep learning model) to identify, collect and/or analyze the context information related to data storage at the respective data storage system. In one or more cases, the model additionally and/or alternatively can be employed to generate a tiering policy based on the context information. That is, one or more data storage attributes can be determined from and/or comprised by the context information. Based on one or more various thresholds, assigned weights, preferences and/or other considerations, a tiering policy can be generated from the context information. The generated tiering policy can define one or more elements of tiering storage, such as, but not limited to, organization, access, storage requirements, maintenance and/or retention relative to data being stored at and/or intended to be stored at the respective storage system. An automated report output can be generated and identify a recommended tiering policy and one or more bases for the recommendation. Further, the access to a feedback system can be provided to the client, such as via an easily accessible portal, webpage, graphical user interface (GUI) and/or the like.

In view of use of the one or more embodiments described herein, one or more advantages can be realized including, but not limited to increased customer satisfaction, reduced policy formation time, increased efficiency of tiering and/or increased compliance adherence. A customer/client entity can selectively amend the tiering policy and/or submit feedback that can be employed to automatically amend the tiering policy. This can be accomplished in view of the tiering policy advising system's ability to automatically detect storage context, known workload, historical data and/or the like. As a result, in response to application of a tiering policy, the system further can identify data for tiering based on one or more thresholds and/or rules of the applied tiering policy.

Reference throughout this specification to "one embodiment," "an embodiment," "one implementation," "an implementation," etc. means that a particular feature, structure, or characteristic described in connection with the embodiment/implementation can be included in at least one embodiment/implementation. Thus, the appearances of such a phrase "in one embodiment," "in an implementation," etc. in various places throughout this specification are not necessarily all referring to the same embodiment/implementation. Furthermore, the particular features, structures, or characteristics may be combined in any suitable manner in one or more embodiments/implementations.

As used herein, with respect to any aforementioned and below mentioned uses, the term "in response to" can refer to any one or more states including, but not limited to: at the same time as, at least partially in parallel with, at least partially subsequent to and/or fully subsequent to, where suitable.

As used herein, the term "entity" can refer to a machine, device, smart device, component, hardware, software and/or human.

As used herein, the term "cost" can refer to power, money, memory, processing power and/or the like.

As used herein, the term "resource" can refer to power, money, memory, processing power and/or the like.

Example Tiering Policy Advising Architectures

One or more embodiments are now described with reference to the drawings, where like referenced numerals are used to refer to like elements throughout. In the following description, for purposes of explanation, numerous specific details are set forth to provide a more thorough understanding of the one or more embodiments. It is evident, however, in various cases, that the one or more embodiments can be practiced without these specific details.

Figure 2:
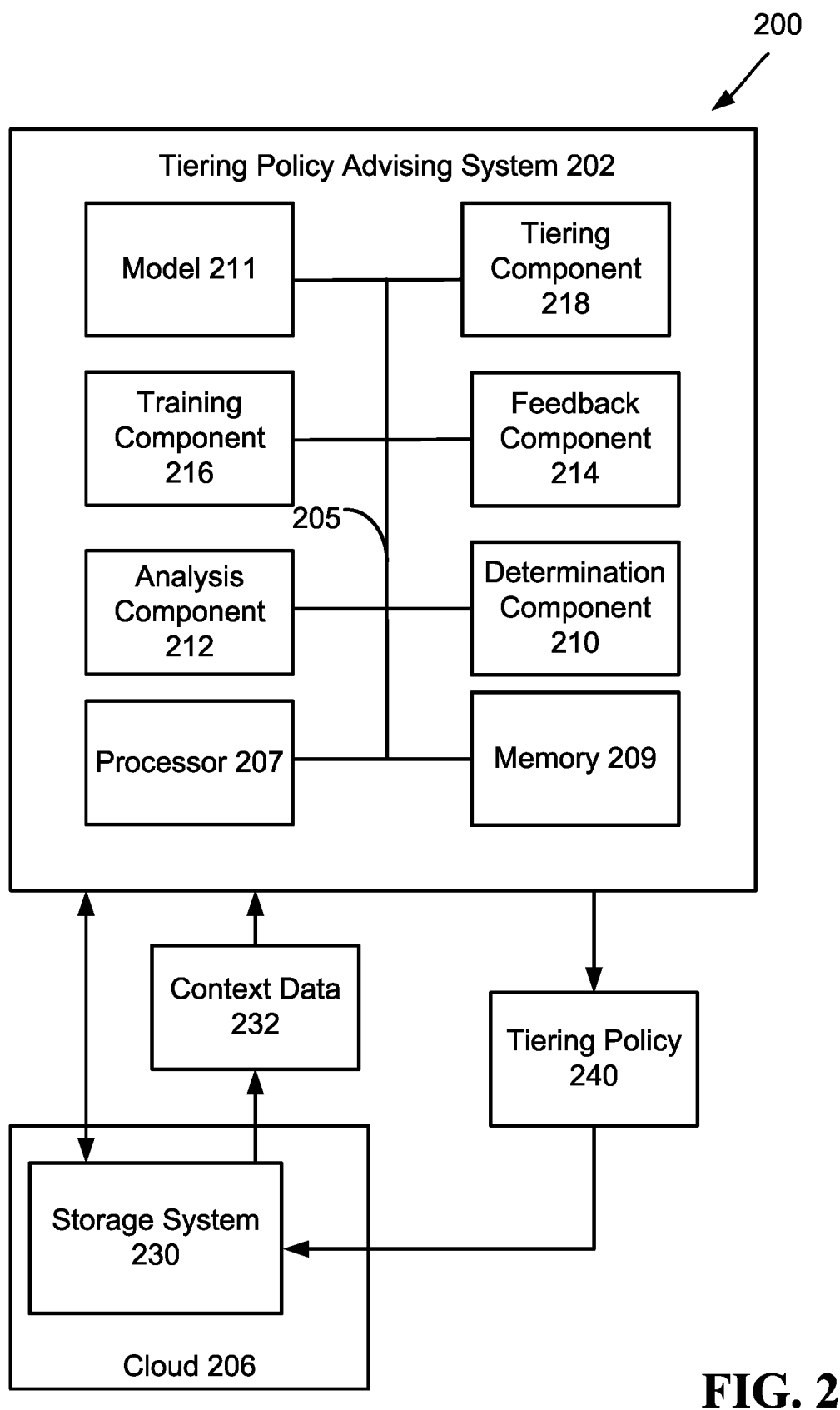
FIG. 2 illustrates a block diagram of a tiering policy advising system, in accordance with one or more embodiments and/or implementations described herein.

Further, the embodiments depicted in one or more figures described herein are for illustration only, and as such, the architecture of embodiments is not limited to the systems, devices and/or components depicted therein, nor to any particular order, connection and/or coupling of systems, devices and/or components depicted therein. For example, in one or more embodiments, the non-limiting system architecture 200 as illustrated at FIG. 2, and/or systems thereof, can further comprise one or more computer and/or computing-based elements described herein with reference to an operating environment, such as the operating environment 900 illustrated at FIG. 9. In one or more described embodiments, computer and/or computing-based elements can be used in connection with implementing one or more of the systems, devices, components and/or computer-implemented operations shown and/or described in connection with FIG. 2 and/or with other figures described herein.

Turning first to FIG. 1, an exemplary storage system, such as multi-node system 100, is illustrated that can employ the tiering policy advising system 202 relative to a plurality of storage devices (e.g., at nodes 110) to be described in detail below, in accordance with one or more embodiment described herein. The system 100 can comprise a plurality of nodes 110, each comprising one or more customer/client storage devices, such as servers 112. The nodes 110 can be in communication with one another via a communication device, such as a data router 114. An administrating node 116 can comprise one or more servers and likewise also is interconnected with the nodes 110 via the data router 114. Although illustrated separately, in one or more embodiments, the administrating node 114 also can comprise one or more customer/client storage devices, such as servers 112, and/or can be a server node 110. The administrating node 114 can comprise a tiering policy advising system, such as the system 202 to be described in detail below.

Turning next to FIG. 2, a schematic of a non-limiting system 200 is depicted, illustrating details of a tiering policy advising system 202 for performing tiering policy generation based on context data 232 from and/or relative to a storage system 230. As illustrated, the storage system 230 can be comprised by and/or supported by a cloud 206, such as a cloud network. The storage system 230 can comprise element of and/or be organized similarly to the multi-node system 100. That is, although the tiering policy advisory system 202 is illustrated separately from the storage system 230, in one or more other embodiments, the tiering policy advising system 202 can be stored and/or otherwise located internal to the storage system 230.

While referring here to one or more processes, operations, facilitations and/or uses of the non-limiting system 200, description provided herein, above and/or below also can be relevant to one or more other non-limiting system architectures described herein. Repetitive description of like elements and/or processes employed in respective embodiments is omitted for sake of brevity.

Generally, the non-limiting system architecture 200 can facilitate a process to automatically identify, collect and/or analyze the context information 232 related to data storage at the respective data storage system 230. The non-limiting system architecture 200 also can facilitate, in one or more cases, automatic adjustment and/or amendment of a tiering policy, such as based on customer/client feedback. As used herein, the customer can be an entity, such as an organization, group, company and/or the like, comprising one or more machines, devices, smart devices, components, hardware, software and/or humans. A recommended tiering policy 240 can be provided, such as output, by the tiering policy advising system 202, such as for review by the customer and/or use by the storage system 230.

The various components of the tiering policy advising system 202 will now be described in detail. Generally, the tiering policy advising system 202 can comprise any suitable computing devices, hardware, software, operating systems, drivers, network interfaces and/or so forth. However, for purposes of brevity, only components generally relevant to cloud provisioning readiness verification are illustrated in FIG. 2.

As illustrated, the tiering policy advising system 202 can comprise a processor 207, memory 209, bus 205, determination component 210, analysis component 212, feedback component 214, training component 216, model 211 and/or tiering component 218.

Communication among the tiering policy advising system 202, cloud 206, data storage system 230, the components of the tiering policy advising system 202, and/or any other component of the non-limiting system architecture 200 can be by any suitable method. Communication can be facilitated by wired and/or wireless methods including, but not limited to, employing a cellular network, a wide area network (WAN) (e.g., the Internet), and/or a local area network (LAN). Suitable wired or wireless technologies for facilitating the communications can include, without being limited to, wireless fidelity (Wi-Fi), global system for mobile communications (GSM), universal mobile telecommunications system (UMTS), worldwide interoperability for microwave access (WiMAX), enhanced general packet radio service (enhanced GPRS), third generation partnership project (3GPP) long term evolution (LTE), third generation partnership project 2 (3GPP2) ultra-mobile broadband (UMB), high speed packet access (HSPA), Zigbee and other 802.XX wireless technologies and/or legacy telecommunication technologies, BLUETOOTH®, Session Initiation Protocol (SIP), ZIGBEE®, RF4CE protocol, WirelessHART protocol, 6LoWPAN (Ipv6 over Low power Wireless Area Networks), Z-Wave, an ANT, an ultra-wideband (UWB) standard protocol and/or other proprietary and/or non-proprietary communication protocols.

Discussion first turns to the processor 207, memory 209 and bus 205 of the tiering policy advising system 202.

In one or more embodiments, tiering policy advising system 202 can comprise a processor 207 (e.g., computer processing unit, microprocessor, classical processor and/or like processor). In one or more embodiments, a component associated with tiering policy advising system 202, as described herein with or without reference to the one or more figures of the one or more embodiments, can comprise one or more computer and/or machine readable, writable and/or executable components and/or instructions that can be executed by processor 207 to facilitate performance of one or more processes defined by such component(s) and/or instruction(s). In one or more embodiments, the processor 207 can comprise one or more of the determination component 210, analysis component 212, feedback component 214, training component 216, model 211 and/or tiering component 218.

In one or more embodiments, the tiering policy advising system 202 can comprise a machine-readable memory 209 that can be operably connected to the processor 207. The memory 209 can store computer-executable instructions that, upon execution by the processor 207, can cause the processor 207 and/or one or more other components of the tiering policy advising system 202 (e.g., determination component 210, analysis component 212, feedback component 214, training component 216, model 211 and/or tiering component 218) to perform one or more actions. In one or more embodiments, the memory 209 can store computer-executable components (e.g., determination component 210, analysis component 212, feedback component 214, training component 216, model 211 and/or tiering component 218).

Tiering policy advising system 202 and/or a component thereof as described herein, can be communicatively, electrically, operatively, optically and/or otherwise coupled to one another via a bus 205 to perform functions of non-limiting system architecture 200, tiering policy advising system 202 and/or one or more components thereof and/or coupled therewith. Bus 205 can comprise one or more of a memory bus, memory controller, peripheral bus, external bus, local bus and/or another type of bus that can employ one or more bus architectures. One or more of these examples of bus 205 can be employed to implement one or more embodiments described herein.

In one or more embodiments, tiering policy advising system 202 can be coupled (e.g., communicatively, electrically, operatively, optically and/or like function) to one or more external systems (e.g., a system management application), sources and/or devices (e.g., classical communication devices and/or like devices), such as via a network. In one or more embodiments, one or more of the components of the non-limiting system architecture 200 can reside in the cloud, and/or can reside locally in a local computing environment (e.g., at a specified location(s)).

In addition to the processor 207 and/or memory 209 described above, tiering policy advising system 202 can comprise one or more computer and/or machine readable, writable and/or executable components and/or instructions that, when executed by processor 207, can facilitate performance of one or more operations defined by such component(s) and/or instruction(s).

Turning now again to FIG. 2, and to components of the tiering policy advising system 202 other than the processor 207, memory 209 and bus 205, the determination component 210 generally can identify, locate, collect, obtain and/or otherwise determine data from a customer data storage system 230, such as the context data 232. The data to collect can be determined, such as by employing one or more API calls and/or programmatic logic for and/or relative to context data 232. These API calls and/or programmatic logic can be based on and/or direct to information/data/metadata upon which one or more data storage attributes (also herein referred to as attributes, data storage parameters, and/or parameters) can be defined. These data storage attributes can be utilized by the analysis component 212 to generate a recommended tiering policy 240. The context data 232 determined can define and/or comprise the one or more data storage attributes and can be provided in any suitable format (e.g., text, binary and/or the like).

As used herein, the data storage attributes can comprise, but are not limited to file size, last accessed time, modified time, last attribute changed time, used space, total capacity, workload such as file use history and/or the like.

Figure 4:
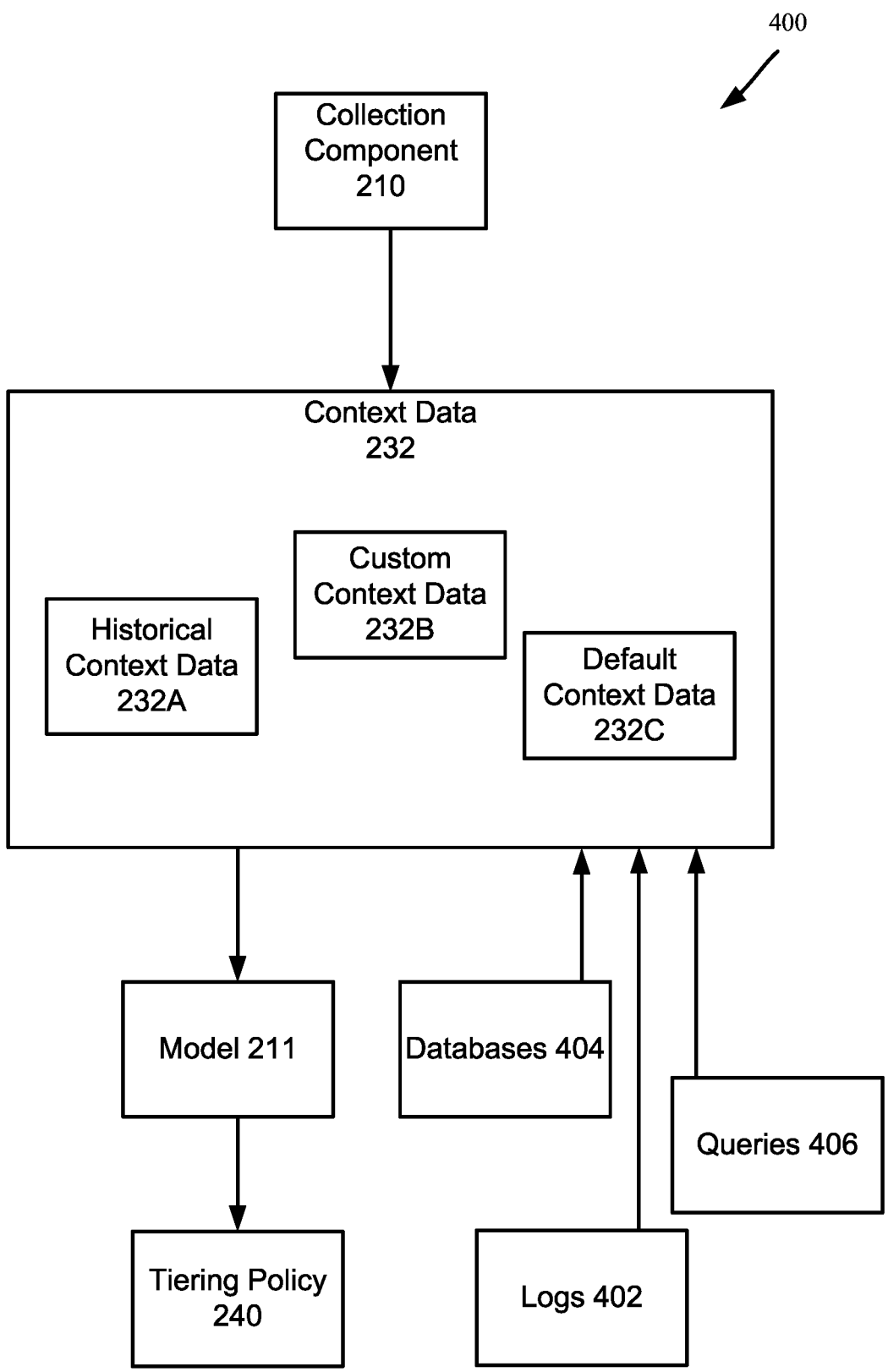
FIG. 4 illustrates exemplary context information employed for one or more tiering policy advising operations, in accordance with one or more embodiments and/or implementations described herein.

In one or more cases, the identification by the determination component 210 can be facilitated by an artificial intelligence process, which can comprise a machine learning process and/or a deep learning process. The artificial intelligence process can be provided and/or facilitate by the model 211, which can be an AI model, ML model or DL model. Although shown as stored and/or located at the compliance mapping system 102, a model 211 can be located elsewhere internal to or external to the non-limiting system 100, such as being accessible by the compliance mapping system 202. Referring to FIG. 4 and also to FIG. 2, the context data 232 can be determined and/or otherwise identified by the model 211 and/or determination component 210 from one or more knowledge databases 404 (e.g., a cloud IQ database), questionnaires, chat bot conversations, computer-generated inquiries, and/or computer-generated dialogues comprising queries 406, and/or logs 402, such as data storage system 230 logs of use of the system 230. As illustrated at FIG. 4, the context data 232 can comprise any one or more of historical context data 232A, custom context data 232B (such as entered and/or submitted by a user entity), and/or default context data 232C. As used herein, default context data 232C can comprise one or more data storage attributes selected as backup/default settings by the system 202 and/or a user entity.

The model 211 employed by the determination component 210, and which also can be employed by the analysis component 212, the feedback component 214 and/or any other suitable component of the compliance mapping system 202, can be initially trained, such as prior to a respective use instance by the determination component 210. The model 211 can be trained, such as by the training component 216, using historical data for various storage contexts, various workloads, various storage arrays and/or various user feedback. A workload, as used herein, can employ one or more different storage arrays. Different workloads can comprise at least one of different data storage uses, dates of use or total capacity of storage used.

In connection with the model 211, in one or more embodiments, the training component 216 can train the model 211 based suitable API calls, logical calls, known and/or previous data storage attributes and/or configuration settings. The training component 216 can train the model 211 based on terminology and/or one or more languages employed by the customer/client, such as to better recognize context data 232 relevant to data storage system attributes. In one or more cases, the training component 216 can train the model 211 at a suitable selected frequency, such as after each iteration of data collection.

In one or more cases, the model 211 (e.g., AI, ML and/or DL model) can be employed to generate the aforementioned questionnaires, inquiries and/or dialogues, such as employing and/or providing a chatbot and/or other interface. Such interface can be provided by an associated interfacing component of the system 202 and can comprise any suitable auditory and/or visual interface, such as comprising, without being limiting, a graphical user interface (GUI), touchscreen, data pad, keyboard, mouse, camera, microphone and/or the like.

The identified context data 232 can be downloaded, uploaded, copied and/or otherwise collected and/or obtained. In one or more cases the obtaining can comprise uploading data to a secure cloud location of the cloud provisioning provider service, such as in the form of SML files and/or other suitable formats.

In response to the data collection and/or determination by the determination component 210, the context data 232 can be analyzed by the analysis component 212. Generally, the analysis component 212 can, employing the model 211, apply weights to the context information 232, where the weights can be associated with data storage attributes of data of the cloud storage system 230 (e.g., of data at and/or intended to be stored at the data storage system 230). Executing a weighted analysis using the weights, one or more data storage attributes can be determined which thereby can define a recommended tiering policy 240 to be output by the system 202.

To first provide a general example, one exemplary set of context information 302 is illustrated at FIG. 3. The context information 302 can comprise and/or be used to identify one or more data storage attributes such as used space, total capacity and/or workload. Based on the context information 302 (weighting process and analysis to be described below in detail), a tiering policy 340 can be generated. As shown, a tiering policy can comprise one or more data storage attributes based on the data storage attributes of the context information 302. The data storage attributes (e.g., attribute labels) of the tiering policy 340 can be the same as and/or different from the data storage attributes of the context information 302.

Figure 5:
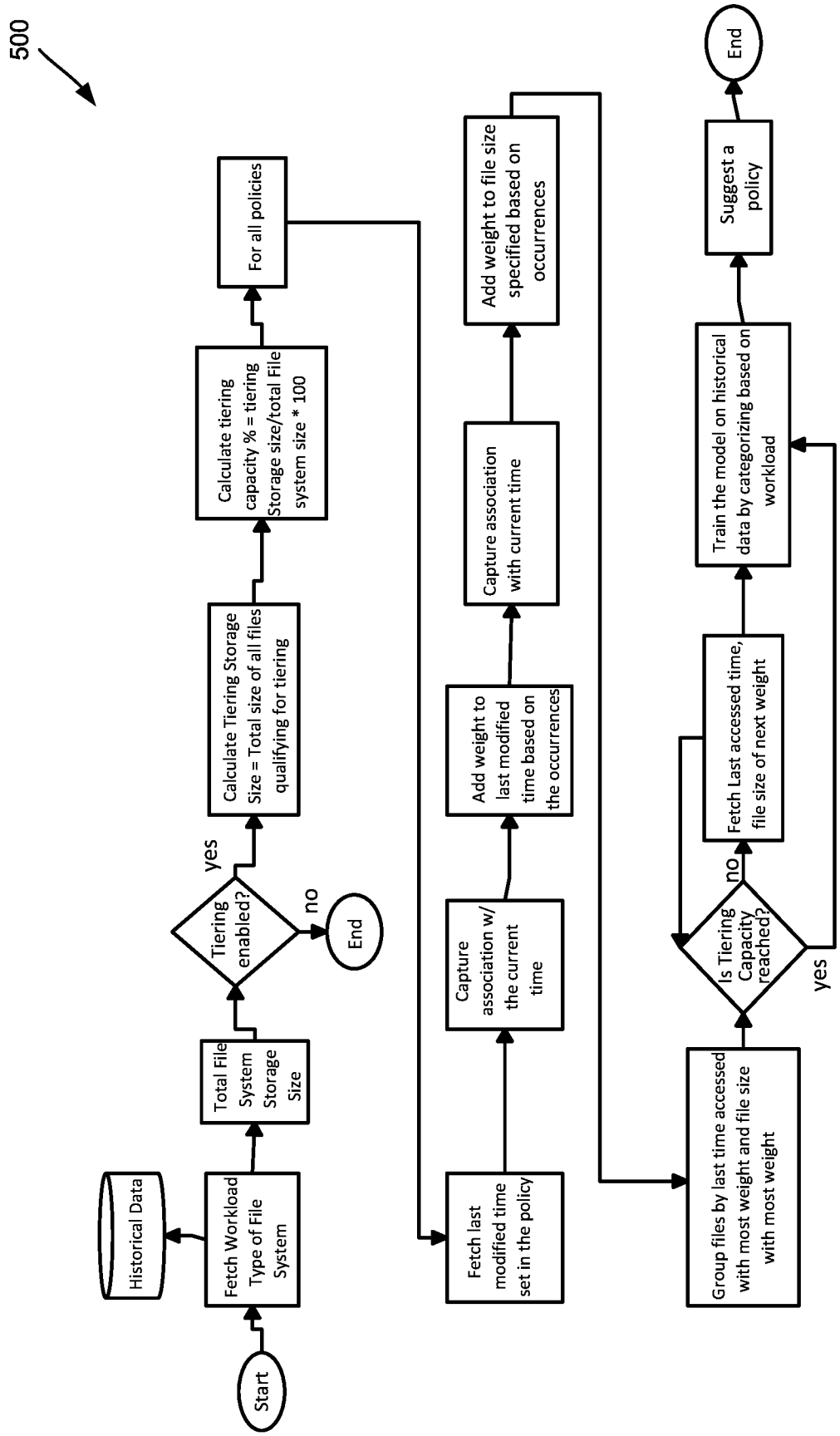
FIG. 5 illustrates a process flow diagram of a general method of cloud provisioning readiness verification, in accordance with one or more embodiments and/or implementations described herein.

Looking still to FIG. 2, and also turning to FIG. 5, the weight application process will now be described.

In one or more embodiments, association rule-based machine learning can be employed for discovering relations, relationships and/or associations between and/or among workload type, file systems and/or policies (such as already determined tiering policies) associated. For example, where there is a share within a filesystem and the filesystem is approaching threshold capacity usage, and the customer has set a policy to tier all files >10 GB for workload type of logs only, then an association is formed between the size of all files qualifying for tier and the total storage capacity on the storage array for this policy set by the customer. That is, if total capacity of the filesystem is 300 GB and the freed capacity from tiering is 100 GB, then a metric can be generated by the analysis component 212 for the tiering capacity to be considered for policy suggestion (ex: 20% of used storage space should be tiered).

Additionally and/or alternatively, weights can be assigned to the file tiering policy attributes (e.g., data storage attributes), such as based on number of occurrences in different policies. This can aid to identify and use customer preference in generation of the tiering policy 240. In such example, a final policy suggested can have the policy attributes set which have maximum weight.

That is, in one or more embodiments, the weights can be applied based on number of occurrences of the data storage attributes of data at the cloud storage system 230. For example, the higher the number of occurrences, the higher the weight applied. In one or more other embodiments, one or more other bases can be employed for setting the weights, such as, but not limited to, particular user, time of use, user feedback, one or more aggregated/averaged/combined attribute values, and/or the like.

In response to the weighted analysis, the analysis component 212, such as employing the model 211, can generate the tiering policy 240 comprising data storage attributes of the data of the cloud storage system 230, wherein at least one of the data storage attributes can be set based on the weights.

In one or more cases, at least one data storage attribute can be set equal to a data storage attribute having a highest weight of a set of weights for that data storage attribute applied by the model 211.

In one or more embodiments, where plural instances of the context information 232 have a same weight applied to respective ones of the plural instances of the context information 232, the data storage attribute can be set in the tiering policy 240 to be equal to a highest attribute value of the respective data storage attribute among the respective ones of the plural instances. For example, where multiple instances have a same applied weight, the maximum attribute value can be used for the tiering policy, such as to ensure that all users and/or workloads are satisfied. That is, if all policy attributes have same weight, then the higher attribute value can be considered. For example, if weight of file size <2 MB has a same weight as attribute file size <4 MB, then the file size <4 MB can be considered as such can account for 2 MB size also.

In yet another example, if the auto suggested policy does not meet the tiering capacity expected, then the policy attribute with next highest weight can be considered for suggesting policy. This can ensure that the recommended tiering policy meets the expected tiering capacity. That is, in an example, when a logs only workload is detected, then tiering policy suggestion can be generated considering similar workload and/or a preference set previously by one or more user entities. Similarly in a case of sequential workloads, the model 211 can be trained to find a customer preference and the time and size attributes can be set accordingly in a generated tiering policy 240.

In one or more embodiments, where historical and/or custom context data 232 (e.g., 232A and 232B) is not identified, available and/or accessible, and/or where a threshold of historical data quantity and/or quality is not met, the analysis component 212 alternatively can recommend a default tiering policy. The default tiering policy can be based on a predefined tiering capacity metric, such as on the default context data 232C (FIG. 4). For example, exemplary thresholds upon which a default policy can be generated can comprise last accessed time and/or file size, which default data storage attributes can be modified by an entity, such as employing the feedback component 214 in one or more feedback/recommendation/review iterations.

In one or more embodiments, an association rule can be obtained for one or more of, such as each of, of the file attributes of size (size of the file), atime (LastAccessedTime), mtime (LastModifiedTime), attrctime (LastAttrChangedTime), and/or the like.

In one or more embodiments, a tiering policy, and/or a portion thereof, can be generated and recommended by a user entity, and input into the model 211, such as via the feedback component 214.

Furthermore, in one or more embodiments, one or more thresholds can be set for one or more weights. That is, where one or more weights do not transition a selected threshold, a default context data 232C or custom context data 232B can be automatically applied (e.g., the data storage attributes thereof). A threshold can be set by a user entity and/or by the system 202, for example.

Furthermore, in one or more embodiments, one or more thresholds can be set for a data storage attribute. For example, a data storage attribute of the tiering policy 240 can be a limit, a minimum, a maximum, a range and/or a combination thereof. A threshold can be set by a user entity and/or by the system 202, for example.

Next, in response to the tiering policy 240 being generated, the tiering policy (e.g., a recommendation thereof) can be output to a customer/client. Generally, employing one or more cycles/iterations of use of the feedback component 214 and analysis component 212/model 211, the recommended tiering policy 240 can be reviewed, modified, updated, and reviewed again. This cycle can continue until a user entity chooses to apply the output recommended tiering policy or deny application of the tiering policy. The denial can be absolute, temporary, a postponement and/or the like.

Generally, the feedback component 214 can allow for review of the recommended tiering policy 240 and its particulars prior to automatically applying and/or using the tiering policy 240 for the storage system 230. The reviewing entity can customize, reject and/or omit one or more portions of the recommended tiering policy 240. In response to the feedback, the model 211/analysis component 212 can update one or more weights and/or one or more appropriate weights can be added or removed. As a result, the model 211/analysis component 212 can provide another iteration of a recommended tiering policy 240. In one or more cases, a reviewing entity can skip the tiering policy review until a later time. In one or more cases, a reviewing entity can submit an approval for automatic use of the tiering policy 240, separate from any later review of the tiering policy 240.

In one or more cases the feedback component 214 can be connected to, communicate with and/or comprise a user interface, such as a graphical user interface. In one or more cases the feedback component 214 can employ, access and/or comprise a chatbot to facilitate elicitation of feedback regarding the recommending tiering policy from an entity, such as an administrating entity. Such chatbot can be driven by the model 211. A suitable interface for and/or comprised by the feedback component 214 can comprise any suitable auditory and/or visual interface, such as comprising, without being limiting, a graphical user interface (GUI), touchscreen, data pad, keyboard, mouse, camera, microphone and/or the like.

Figure 6:
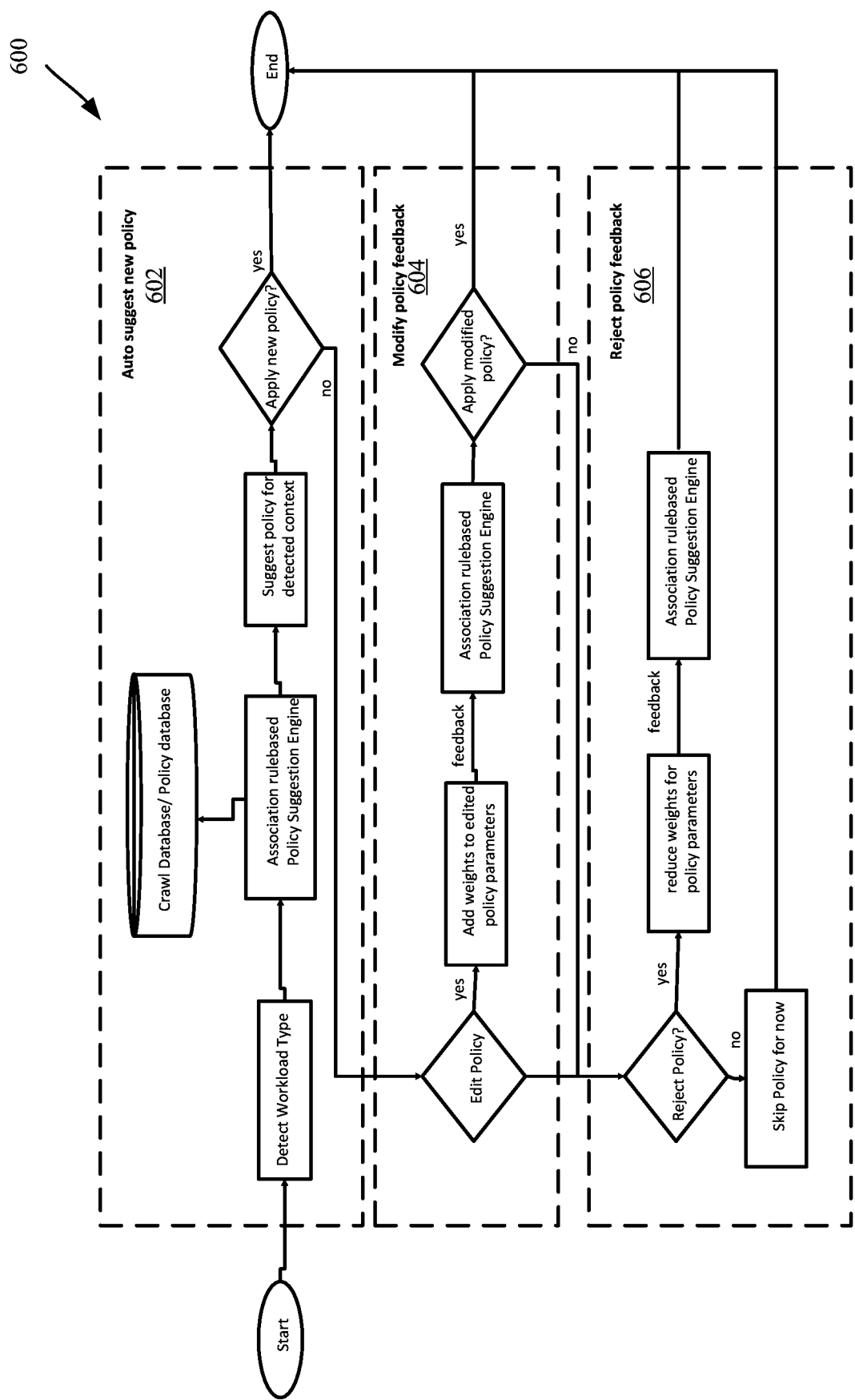
FIG. 6 exemplary tiering policy advising operations, in accordance with one or more embodiments and/or implementations described herein.

For example, turning now to FIG. 6, and also still referring to FIG. 2, one or more feedback operations will now be described.

As shown at stage 602, a tiering policy can be automatically suggested by the system 202. This stage 602 can comprise detecting workload type, employing one or more databases, associating weights and/or rules with context information, suggesting a tiering policy and/or determining whether to automatically apply the new tiering policy.

At modification/feedback stage 604, the stage can comprise editing the tiering policy, adjusting weights of one or more data storage attributes of the tiering policy, adjusting one or more associations between context information and data storage attributes, and/or determining whether to automatically apply the new tiering policy.

Alternatively, at rejection/denial/feedback stage 606, the stage can comprise determining whether or not to reject application of the tiering policy. Where rejected, the system 202, such as the analysis component 212, can automatically adjust, such as reduce, weights for one or more data storage attributes of the rejected tiering policy. Likewise, where rejected, the system 202, such as the analysis component 212, can automatically adjust one or more associations between context information and data storage attributes.

Turning again to FIG. 2, upon approval of a tiering policy 240, a tiering component 218 can identify data for tiering based on one or more thresholds, storage attributes and/or rules of the applied tiering policy 240. The tiering component 218 can be assisted by the model 211, such as where the model 211, based on training according to the applied tiering policy 240 (e.g., by the training component 216), can assist in locating and/or otherwise determining data for tiered storage. Likewise the tiering component 218 and model 211 can similarly store the data in a tiered manner, also according to the applied tiering policy 240 and associated training of the model 211.

Example Tiering Policy Advising Operations

Figure 7:
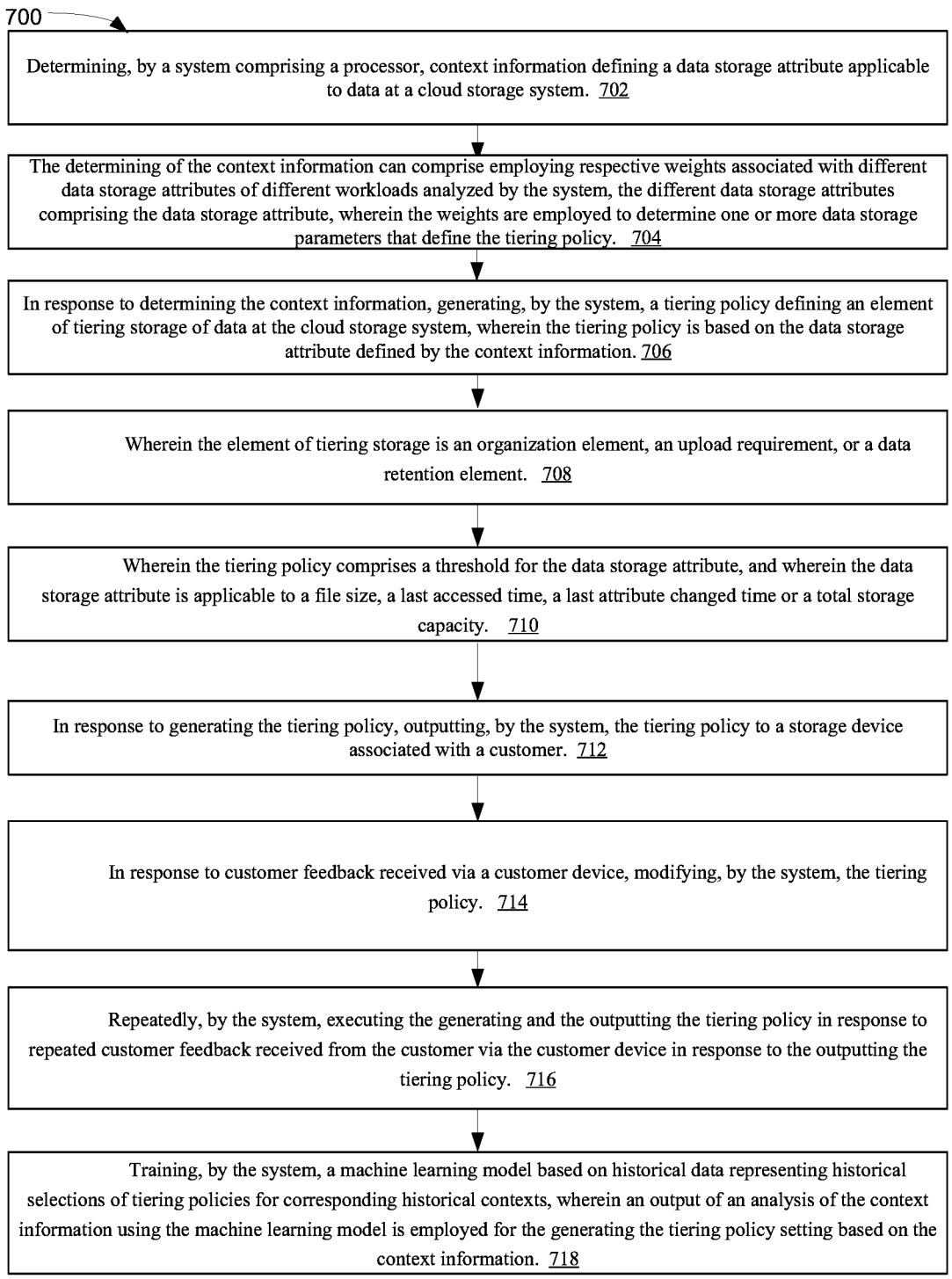
FIG. 7 illustrates a process flow diagram of a method of tiering policy advising, in accordance with one or more embodiments and/or implementations described herein.

Turning now to FIG. 7, a process flow comprising a set of operations is illustrated relative to FIG. 2. One or more elements, objects and/or components referenced in the process flow 700 can be those of architecture 100 and/or diagram 200. Repetitive description of like elements and/or processes employed in respective embodiments is omitted for sake of brevity.

At operation 702, the process flow 700 can comprise determining, by a system comprising a processor (e.g., determination component 210), context information defining a data storage attribute applicable to data at a cloud storage system. In one or more embodiments, the context information can comprise historical context information.

At operation 704, the process flow 700 can comprise the determining of the context information comprises employing respective weights associated with different data storage attributes of different workloads analyzed by the system, the different data storage attributes comprising the data storage attribute, wherein the weights are employed to determine one or more data storage attributes that define the tiering policy.

At operation 706, the process flow 700 can comprise, in response to determining the context information, generating, by the system (e.g., analysis component 212), a tiering policy defining an element of tiering storage of data at the cloud storage system, wherein the tiering policy is based on the data storage attribute defined by the context information.

At operation 708, the process flow 700 can comprise wherein the element of tiering storage is an organization element, an upload requirement, or a data retention element.

At operation 710, the process flow 700 can comprise wherein the tiering policy comprises a threshold for the data storage attribute, and wherein the data storage attribute is applicable to a file size, a last accessed time, a last attribute changed time or a total storage capacity.

At operation 712, the process flow 700 can comprise, in response to generating the tiering policy, outputting, by the system (e.g., analysis component 212), the tiering policy to a storage device associated with a customer.

At operation 714, the process flow 700 can comprise, in response to customer feedback received via a customer device, modifying, by the system (e.g., analysis component 212), the tiering policy.

At operation 716, the process flow 700 can comprise repeatedly, by the system (e.g., analysis component 212), executing the generating and the outputting the tiering policy in response to repeated customer feedback received from the customer via the customer device in response to the outputting the tiering policy.

At operation 718, the process flow 700 can comprise training, by the system (e.g., training component 216), a machine learning model based on historical data representing historical selections of tiering policies for corresponding historical contexts, wherein an output of an analysis of the context information using the machine learning model is employed for the generating the tiering policy setting based on the context information.

Figure 8:
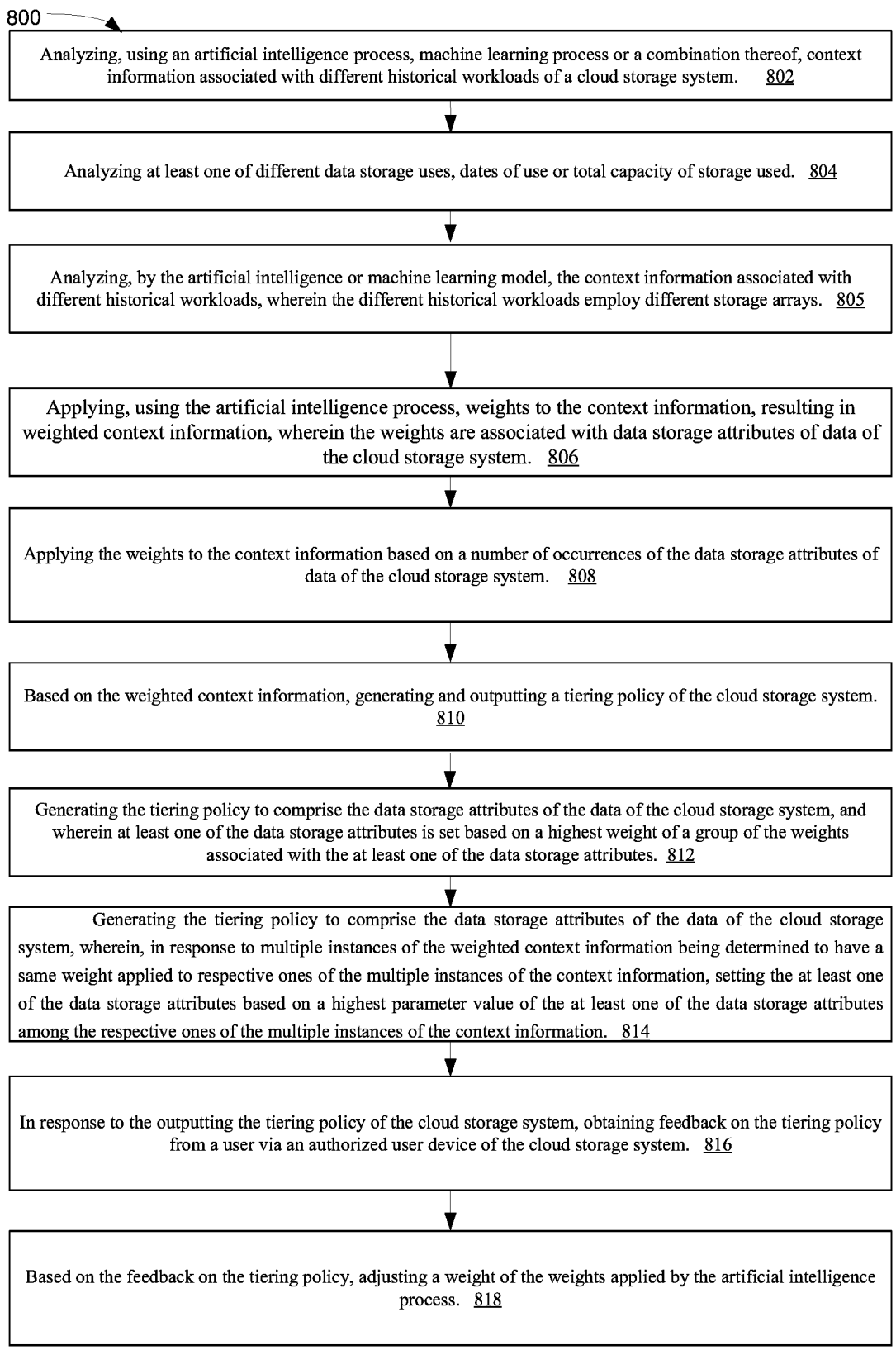
FIG. 8 illustrates a process flow diagram of another method of tiering policy advising, in accordance with one or more embodiments and/or implementations described herein.

Turning now to FIG. 8, a process flow comprising a set of operations is illustrated relative to FIG. 2. One or more elements, objects and/or components referenced in the process flow 800 can be those of architecture 100 and/or diagram 200. Repetitive description of like elements and/or processes employed in respective embodiments is omitted for sake of brevity.

At operation 802, the process flow 800 can comprise analyzing, using an artificial intelligence process, a machine learning process or a combination thereof, context information associated with different historical workloads of a cloud storage system.

At operation 804, the process flow 800 can comprise analyzing at least one of different data storage uses, dates of use or total capacity of storage used.

At operation 805, the process flow 800 can comprise analyzing, by the artificial intelligence or machine learning model, the context information associated with different historical workloads, wherein the different historical workloads employ different storage arrays.

At operation 806, the process flow 800 can comprise applying, using the artificial intelligence process, weights to the context information, resulting in weighted context information, wherein the weights are associated with data storage attributes of data of the cloud storage system.

At operation 808, the process flow 800 can comprise applying the weights to the context information based on a number of occurrences of the data storage attributes of data of the cloud storage system.

At operation 810, the process flow 800 can comprise, based on the weighted context information, generating and outputting a tiering policy of the cloud storage system.

At operation 812, the process flow 800 can comprise generating the tiering policy to comprise the data storage attributes of the data of the cloud storage system, and wherein at least one of the data storage attributes is set based on a highest weight of a group of the weights associated with the at least one of the data storage attributes.

At operation 814, the process flow 800 can comprise generating the tiering policy to comprise the data storage attributes of the data of the cloud storage system, wherein, in response to multiple instances of the weighted context information being determined to have a same weight applied to respective ones of the multiple instances of the context information, setting the at least one of the data storage attributes based on a highest attribute value of the at least one of the data storage attributes among the respective ones of the multiple instances of the context information.

At operation 816, the process flow 800 can comprise, in response to the outputting the tiering policy of the cloud storage system, obtaining feedback on the tiering policy from a user via an authorized user device of the cloud storage system.

At operation 818, the process flow 800 can comprise, based on the feedback on the tiering policy, adjusting a weight of the weights applied by the artificial intelligence process.

For simplicity of explanation, the computer-implemented methodologies and/or processes provided herein are depicted and/or described as a series of acts. The subject innovation is not limited by the acts illustrated and/or by the order of acts, for example acts can occur in one or more orders and/or concurrently, and with other acts not presented and described herein. The operations of process flows of illustrations 400, 600, 700 and/or 800 are example operations, and there can be one or more embodiments that implement more or fewer operations than are depicted.

Furthermore, not all illustrated acts can be utilized to implement the computer-implemented methodologies in accordance with the described subject matter. In addition, the computer-implemented methodologies could alternatively be represented as a series of interrelated states via a state diagram or events. Additionally, the computer-implemented methodologies described hereinafter and throughout this specification are capable of being stored on an article of manufacture to facilitate transporting and transferring the computer-implemented methodologies to computers. The term article of manufacture, as used herein, is intended to encompass a computer program accessible from any machine-readable device or storage media.

In summary, technology described herein can be employed to automatically recommend a tiering policy for data storage of data at a data storage system, such as a cloud storage system. An example method can comprise determining, by a system comprising a processor, context information defining a data storage attribute applicable to data at a cloud storage system. The method can comprise, in response to determining the context information, generating, by the system, a tiering policy defining an element of tiering storage of data at the cloud storage system, wherein the tiering policy is based on the data storage attribute defined by the context information. The method also can comprise, in response to generating the tiering policy, outputting, by the system, the tiering policy to a storage device associated with a customer. The analysis can be performed using an artificial intelligence process, machine learning process or a combination thereof.

As a result, a method can be provided that can be associated with increased customer satisfaction, reduced policy formation time, increased efficiency of tiering and/or increased compliance adherence. A customer/client entity can selectively amend the tiering policy and/or submit feedback that can be employed to automatically amend the tiering policy. This can be accomplished in view of the tiering policy advising system's ability to automatically detect storage context, known workload, historical data and/or the like. As a result, in response to application of a tiering policy, the system further can identify data for tiering based on one or more thresholds and/or rules of the applied tiering policy.

Indeed, the one or more embodiments described herein can provide automatic tiering policy setting and adjustment and can reduce errors introduced by manual, time-consuming and/or labor-intensive existing tiering policy generation processes. Reduced back-and-forth between the data storage system and customer can be facilitated.

The systems and/or devices have been (and/or will be further) described herein with respect to interaction between one or more components. Such systems and/or components can include those components or sub-components specified therein, one or more of the specified components and/or sub-components, and/or additional components. Sub-components can be implemented as components communicatively coupled to other components rather than included within parent components. One or more components and/or sub-components can be combined into a single component providing aggregate functionality. The components can interact with one or more other components not specifically described herein for the sake of brevity, but known by those of skill in the art.

One or more embodiments described herein are inherently and/or inextricably tied to computer technology and cannot be implemented outside of a computing environment. For example, one or more processes performed by one or more embodiments described herein can more efficiently, and even more feasibly, provide program and/or program instruction execution as compared to existing systems and/or techniques. Systems, computer-implemented methods and/or computer program products facilitating performance of these processes are of great utility in the field of data storage, such as over a cloud data storage, and cannot be equally practicably implemented in a sensible way outside of a computing environment.

One or more embodiments described herein can employ hardware and/or software to solve problems that are highly technical, that are not abstract, and that cannot be performed as a set of mental acts by a human. For example, a human, or even thousands of humans, cannot efficiently, accurately and/or effectively automatically gather context information, analyze the information via system of weights, and/or generate a tiering policy as the one or more embodiments described herein can facilitate these processes. And, neither can the human mind nor a human with pen and paper automatically gather context information, analyze the information via system of weights, and/or generate a tiering policy as conducted by one or more embodiments described herein.

In one or more embodiments, one or more of the processes described herein can be performed by one or more specialized computers (e.g., a specialized processing unit, a specialized classical computer, and/or another type of specialized computer) to execute defined tasks related to the one or more technologies describe above. One or more embodiments described herein and/or components thereof can be employed to solve new problems that arise through advancements in technologies mentioned above, employment of cloud computing systems, computer architecture and/or another technology.

One or more embodiments described herein can be fully operational towards performing one or more other functions (e.g., fully powered on, fully executed and/or another function) while also performing the one or more operations described herein.

Example Operating Environment

Figure 9:
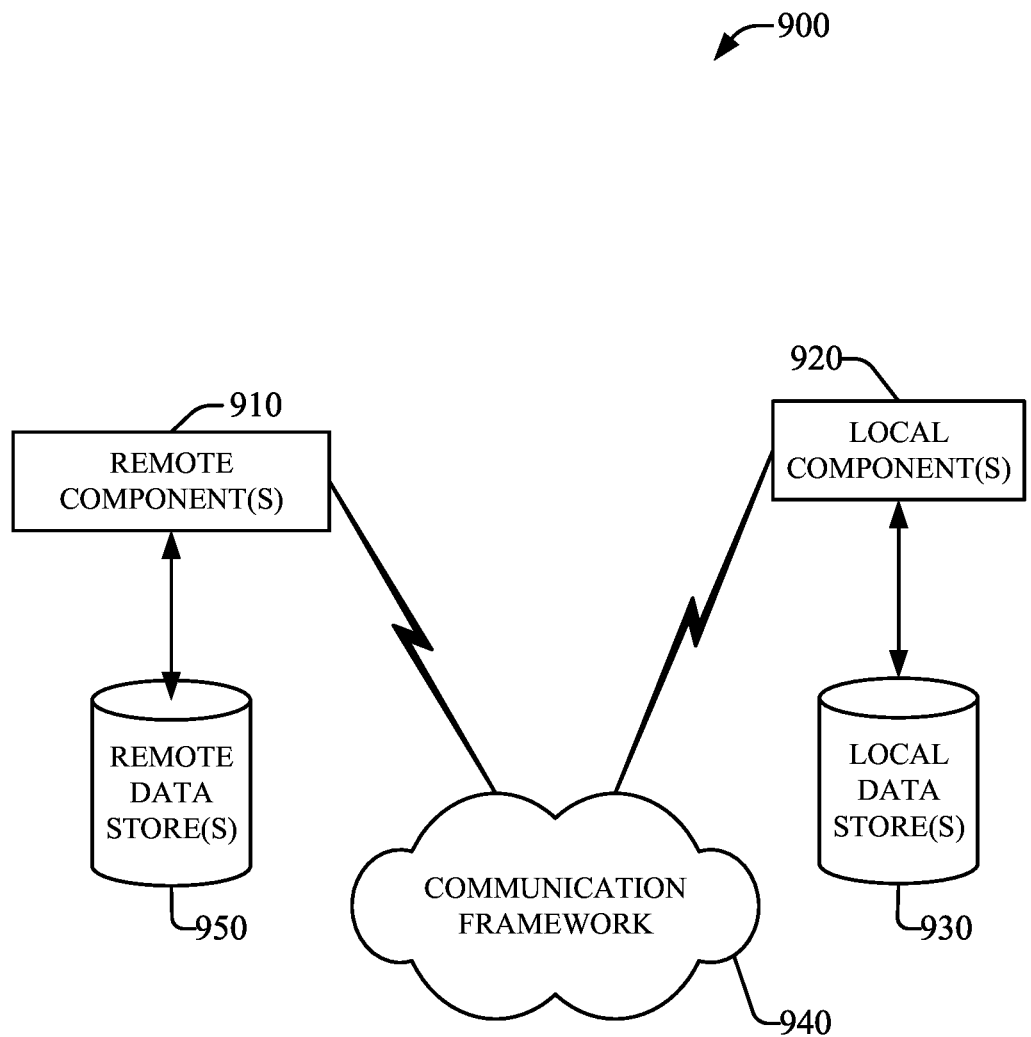
FIG. 9 illustrates a block diagram of an example operating environment into which embodiments of the subject matter described herein can be incorporated.

FIG. 9 is a schematic block diagram of an operating environment 900 with which the described subject matter can interact. The operating environment 900 comprises one or more remote component(s) 910. The remote component(s) 910 can be hardware and/or software (e.g., threads, processes, computing devices). In one or more embodiments, remote component(s) 910 can be a distributed computer system, connected to a local automatic scaling component and/or programs that use the resources of a distributed computer system, via communication framework 940. Communication framework 940 can comprise wired network devices, wireless network devices, mobile devices, wearable devices, radio access network devices, gateway devices, femtocell devices, servers, etc.

The operating environment 900 also comprises one or more local component(s) 920. The local component(s) 920 can be hardware and/or software (e.g., threads, processes, computing devices). In one or more embodiments, local component(s) 920 can comprise an automatic scaling component and/or programs that communicate/use the remote resources 910 and 920, etc., connected to a remotely located distributed computing system via communication framework 940.

One possible communication between a remote component(s) 910 and a local component(s) 920 can be in the form of a data packet adapted to be transmitted between two or more computer processes. Another possible communication between a remote component(s) 910 and a local component(s) 920 can be in the form of circuit-switched data adapted to be transmitted between two or more computer processes in radio time slots. The operating environment 900 comprises a communication framework 940 that can be employed to facilitate communications between the remote component(s) 910 and the local component(s) 920, and can comprise an air interface, e.g., interface of a UMTS network, via a long-term evolution (LTE) network, etc. Remote component(s) 910 can be operably connected to one or more remote data store(s) 950, such as a hard drive, solid state drive, SIM card, device memory, etc., that can be employed to store information on the remote component(s) 910 side of communication framework 940. Similarly, local component(s) 920 can be operably connected to one or more local data store(s) 930, that can be employed to store information on the local component(s) 920 side of communication framework 940.

Example Computing Environment

Figure 10:
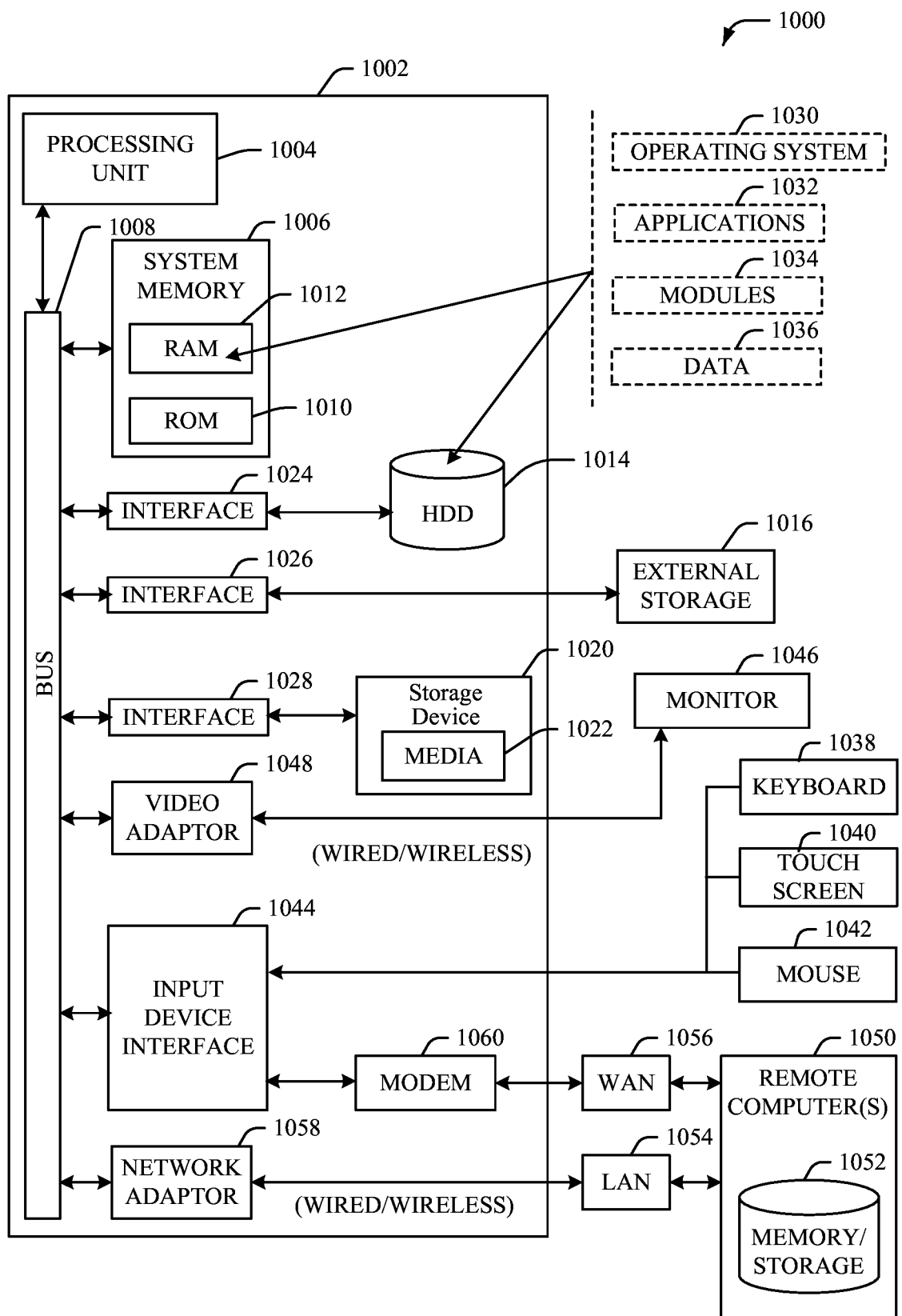
FIG. 10 illustrates an example schematic block diagram of a computing environment with which the subject matter described herein can interact and/or be implemented at least in part, in accordance with one or more embodiments and/or implementations described herein.

In order to provide additional context for various embodiments described herein, FIG. 10 and the following discussion are intended to provide a brief, general description of a suitable computing environment 1000 in which the various embodiments of the embodiment described herein can be implemented. While the embodiments have been described above in the general context of computer-executable instructions that can run on one or more computers, those skilled in the art will recognize that the embodiments can be also implemented in combination with other program modules and/or as a combination of hardware and software.

Generally, program modules include routines, programs, components, data structures, etc., that perform particular tasks or implement particular abstract data types. Moreover, the methods can be practiced with other computer system configurations, including single-processor or multiprocessor computer systems, minicomputers, mainframe computers, Internet of Things (IoT) devices, distributed computing systems, as well as personal computers, hand-held computing devices, microprocessor-based or programmable consumer electronics, and the like, each of which can be operatively coupled to one or more associated devices.

The illustrated embodiments of the embodiments herein can be also practiced in distributed computing environments where certain tasks are performed by remote processing devices that are linked through a communications network. In a distributed computing environment, program modules can be located in both local and remote memory storage devices.

Computing devices typically include a variety of media, which can include computer-readable storage media, machine-readable storage media, and/or communications media, which two terms are used herein differently from one another as follows. Computer-readable storage media or machine-readable storage media can be any available storage media that can be accessed by the computer and includes both volatile and nonvolatile media, removable and non-removable media. By way of example, and not limitation, computer-readable storage media or machine-readable storage media can be implemented in connection with any method or technology for storage of information such as computer-readable or machine-readable instructions, program modules, structured data or unstructured data.

Computer-readable storage media can include, but are not limited to, random access memory (RAM), read only memory (ROM), electrically erasable programmable read only memory (EEPROM), flash memory or other memory technology, compact disk read only memory (CD-ROM), digital versatile disk (DVD), Blu-ray disc (BD) or other optical disk storage, magnetic cassettes, magnetic tape, magnetic disk storage or other magnetic storage devices, solid state drives or other solid state storage devices, or other tangible and/or non-transitory media which can be used to store desired information. In this regard, the terms "tangible" or "non-transitory" herein as applied to storage, memory or computer-readable media, exclude only propagating transitory signals per se as modifiers and do not relinquish rights to all standard storage, memory or computer-readable media that are not only propagating transitory signals per se.

Computer-readable storage media can be accessed by one or more local or remote computing devices, e.g., via access requests, queries or other data retrieval protocols, for a variety of operations with respect to the information stored by the medium.

Communications media typically embody computer-readable instructions, data structures, program modules or other structured or unstructured data in a data signal such as a modulated data signal, e.g., a carrier wave or other transport mechanism, and includes any information delivery or transport media. The term "modulated data signal" or signals refers to a signal that has one or more of its characteristics set or changed in such a manner as to encode information in one or more signals. By way of example, and not limitation, communication media include wired media, such as a wired network or direct-wired connection, and wireless media such as acoustic, RF, infrared and other wireless media.

Referring still to FIG. 10, the example computing environment 1000 which can implement one or more embodiments described herein includes a computer 1002, the computer 1002 including a processing unit 1004, a system memory 1006 and a system bus 1008. The system bus 1008 couples system components including, but not limited to, the system memory 1006 to the processing unit 1004. The processing unit 1004 can be any of various commercially available processors. Dual microprocessors and other multiprocessor architectures can also be employed as the processing unit 1004.

The system bus 1008 can be any of several types of bus structure that can further interconnect to a memory bus (with or without a memory controller), a peripheral bus, and a local bus using any of a variety of commercially available bus architectures. The system memory 1006 includes ROM 1010 and RAM 1012. A basic input/output system (BIOS) can be stored in a non-volatile memory such as ROM, erasable programmable read only memory (EPROM), EEPROM, which BIOS contains the basic routines that help to transfer information between elements within the computer 1002, such as during startup. The RAM 1012 can also include a high-speed RAM such as static RAM for caching data.

The computer 1002 further includes an internal hard disk drive (HDD) 1014 (e.g., EIDE, SATA), and can include one or more external storage devices 1016 (e.g., a magnetic floppy disk drive (FDD) 1016, a memory stick or flash drive reader, a memory card reader, etc.). While the internal HDD 1014 is illustrated as located within the computer 1002, the internal HDD 1014 can also be configured for external use in a suitable chassis (not shown). Additionally, while not shown in computing environment 1000, a solid state drive (SSD) could be used in addition to, or in place of, an HDD 1014.

Other internal or external storage can include at least one other storage device 1020 with storage media 1022 (e.g., a solid state storage device, a nonvolatile memory device, and/or an optical disk drive that can read or write from removable media such as a CD-ROM disc, a DVD, a BD, etc.). The external storage 1016 can be facilitated by a network virtual machine. The HDD 1014, external storage device(s) 1016 and storage device (e.g., drive) 1020 can be connected to the system bus 1008 by an HDD interface 1024, an external storage interface 1026 and a drive interface 1028, respectively.

The drives and their associated computer-readable storage media provide nonvolatile storage of data, data structures, computer-executable instructions, and so forth. For the computer 1002, the drives and storage media accommodate the storage of any data in a suitable digital format. Although the description of computer-readable storage media above refers to respective types of storage devices, other types of storage media which are readable by a computer, whether presently existing or developed in the future, could also be used in the example operating environment, and further, that any such storage media can contain computer-executable instructions for performing the methods described herein.

A number of program modules can be stored in the drives and RAM 1012, including an operating system 1030, one or more application programs 1032, other program modules 1034 and program data 1036. All or portions of the operating system, applications, modules, and/or data can also be cached in the RAM 1012. The systems and methods described herein can be implemented utilizing various commercially available operating systems or combinations of operating systems.

Computer 1002 can optionally comprise emulation technologies. For example, a hypervisor (not shown) or other intermediary can emulate a hardware environment for operating system 1030, and the emulated hardware can optionally be different from the hardware illustrated in FIG. 10. In such an embodiment, operating system 1030 can comprise one virtual machine (VM) of multiple VMs hosted at computer 1002. Furthermore, operating system 1030 can provide runtime environments, such as the Java runtime environment or the .NET framework, for applications 1032. Runtime environments are consistent execution environments that allow applications 1032 to run on any operating system that includes the runtime environment. Similarly, operating system 1030 can support containers, and applications 1032 can be in the form of containers, which are lightweight, standalone, executable packages of software that include, e.g., code, runtime, system tools, system libraries and settings for an application.

Further, computer 1002 can be enabled with a security module, such as a trusted processing module (TPM). For instance, with a TPM, boot components hash next in time boot components, and wait for a match of results to secured values, before loading a next boot component. This process can take place at any layer in the code execution stack of computer 1002, e.g., applied at the application execution level or at the operating system (OS) kernel level, thereby enabling security at any level of code execution.

A user can enter commands and information into the computer 1002 through one or more wired/wireless input devices, e.g., a keyboard 1038, a touch screen 1040, and a pointing device, such as a mouse 1042. Other input devices (not shown) can include a microphone, an infrared (IR) remote control, a radio frequency (RF) remote control, or other remote control, a joystick, a virtual reality controller and/or virtual reality headset, a game pad, a stylus pen, an image input device, e.g., camera(s), a gesture sensor input device, a vision movement sensor input device, an emotion or facial detection device, a biometric input device, e.g., fingerprint or iris scanner, or the like. These and other input devices are often connected to the processing unit 1004 through an input device interface 1044 that can be coupled to the system bus 1008, but can be connected by other interfaces, such as a parallel port, an IEEE 1394 serial port, a game port, a USB port, an IR interface, a BLUETOOTH® interface, etc.

A monitor 1046 or other type of display device can be also connected to the system bus 1008 via an interface, such as a video adapter 1048. In addition to the monitor 1046, a computer typically includes other peripheral output devices (not shown), such as speakers, printers, etc.

The computer 1002 can operate in a networked environment using logical connections via wired and/or wireless communications to one or more remote computers, such as a remote computer(s) 1050. The remote computer(s) 1050 can be a workstation, a server computer, a router, a personal computer, portable computer, microprocessor-based entertainment appliance, a peer device or other common network node, and typically includes many or all of the elements described relative to the computer 1002, although, for purposes of brevity, only a memory/storage device 1052 is illustrated. The logical connections depicted include wired/wireless connectivity to a local area network (LAN) 1054 and/or larger networks, e.g., a wide area network (WAN) 1056. Such LAN and WAN networking environments are commonplace in offices and companies, and facilitate enterprise-wide computer networks, such as intranets, all of which can connect to a global communications network, e.g., the Internet.

When used in a LAN networking environment, the computer 1002 can be connected to the local network 1054 through a wired and/or wireless communication network interface or adapter 1058. The adapter 1058 can facilitate wired or wireless communication to the LAN 1054, which can also include a wireless access point (AP) disposed thereon for communicating with the adapter 1058 in a wireless mode.

When used in a WAN networking environment, the computer 1002 can include a modem 1060 or can be connected to a communications server on the WAN 1056 via other means for establishing communications over the WAN 1056, such as by way of the Internet. The modem 1060, which can be internal or external and a wired or wireless device, can be connected to the system bus 1008 via the input device interface 1044. In a networked environment, program modules depicted relative to the computer 1002 or portions thereof, can be stored in the remote memory/storage device 1052. The network connections shown are example and other means of establishing a communications link between the computers can be used.

When used in either a LAN or WAN networking environment, the computer 1002 can access cloud storage systems or other network-based storage systems in addition to, or in place of, external storage devices 1016 as described above. Generally, a connection between the computer 1002 and a cloud storage system can be established over a LAN 1054 or WAN 1056 e.g., by the adapter 1058 or modem 1060, respectively. Upon connecting the computer 1002 to an associated cloud storage system, the external storage interface 1026 can, with the aid of the adapter 1058 and/or modem 1060, manage storage provided by the cloud storage system as it would other types of external storage. For instance, the external storage interface 1026 can be configured to provide access to cloud storage sources as if those sources were physically connected to the computer 1002.

The computer 1002 can be operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, store shelf, etc.), and telephone. This can include Wireless Fidelity (Wi-Fi) and BLUETOOTH® wireless technologies. Thus, the communication can be a predefined structure as with a conventional network or simply an ad hoc communication between at least two devices.

Conclusion

The above description of illustrated embodiments of the one or more embodiments described herein, comprising what is described in the Abstract, is not intended to be exhaustive or to limit the described embodiments to the precise forms described. While one or more specific embodiments and examples are described herein for illustrative purposes, various modifications are possible that are considered within the scope of such embodiments and examples, as those skilled in the relevant art can recognize.

In this regard, while the described subject matter has been described in connection with various embodiments and corresponding figures, where applicable, other similar embodiments can be used or modifications and additions can be made to the described embodiments for performing the same, similar, alternative, or substitute function of the described subject matter without deviating therefrom. Therefore, the described subject matter should not be limited to any single embodiment described herein, but rather should be construed in breadth and scope in accordance with the appended claims below.

As it employed in the subject specification, the term "processor" can refer to substantially any computing processing unit or device comprising, but not limited to comprising, single-core processors; single-processors with software multithread execution capability; multi-core processors; multi-core processors with software multithread execution capability; multi-core processors with hardware multithread technology; parallel platforms; and parallel platforms with distributed shared memory. Additionally, a processor can refer to an integrated circuit, an application specific integrated circuit, a digital signal processor, a field programmable gate array, a programmable logic controller, a complex programmable logic device, a discrete gate or transistor logic, discrete hardware components, or any combination thereof designed to perform the functions described herein. Processors can exploit nano-scale architectures to optimize space usage or enhance performance of user equipment. A processor can also be implemented as a combination of computing processing units.

As used in this application, the terms "component," "system," "platform," "layer," "selector," "interface," and the like are intended to refer to a computer-related entity or an entity related to an operational apparatus with one or more specific functionalities, wherein the entity can be either hardware, a combination of hardware and software, software, or software in execution. As an example, a component may be, but is not limited to being, a process running on a processor, a processor, an object, an executable, a thread of execution, a program, and/or a computer. By way of illustration and not limitation, both an application running on a server and the server can be a component. One or more components may reside within a process and/or thread of execution and a component may be localized on one computer and/or distributed between two or more computers. In addition, these components can execute from various computer readable media having various data structures stored thereon. The components may communicate via local and/or remote processes such as in accordance with a signal having one or more data packets (e.g., data from one component interacting with another component in a local system, distributed system, and/or across a network such as the Internet with other systems via the signal). As another example, a component can be an apparatus with specific functionality provided by mechanical parts operated by electric or electronic circuitry, which is operated by a software or a firmware application executed by a processor, wherein the processor can be internal or external to the apparatus and executes at least a part of the software or firmware application. As yet another example, a component can be an apparatus that provides specific functionality through electronic components without mechanical parts, the electronic components can comprise a processor therein to execute software or firmware that confers at least in part the functionality of the electronic components.

In addition, the term "or" is intended to mean an inclusive "or" rather than an exclusive "or." That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances.

While the embodiments are susceptible to various modifications and alternative constructions, certain illustrated implementations thereof are shown in the drawings and have been described above in detail. However, there is no intention to limit the various embodiments to the one or more specific forms described, but on the contrary, the intention is to cover all modifications, alternative constructions, and equivalents falling within the spirit and scope.

In addition to the various implementations described herein, other similar implementations can be used or modifications and additions can be made to the described implementation(s) for performing the same or equivalent function of the corresponding implementation(s) without deviating therefrom. Still further, multiple processing chips or multiple devices can share the performance of one or more functions described herein, and similarly, storage can be effected across a plurality of devices. Accordingly, the various embodiments are not to be limited to any single implementation, but rather are to be construed in breadth, spirit and scope in accordance with the appended claims.

What is claimed is:

1. A method, comprising:
   determining, by a system comprising a processor, context information defining a data storage attribute applicable to data at a cloud storage system;
   in response to determining the context information, generating, by the system, a tiering policy defining an element of tiering storage of data at the cloud storage system, wherein the tiering policy is based on the data storage attribute defined by the context information; and
   in response to generating the tiering policy, outputting, by the system, the tiering policy to a storage device associated with a customer;
   wherein the determining the context information comprises generating and analyzing one or more questionnaires or chatbot conversations, and
   wherein the questionnaire, or the chat executed by a chatbot, is generated based on requested feedback from a user entity of the cloud storage system.

2. The method of claim 1, further comprising:
   in response to customer feedback received via a customer device, modifying, by the system, the tiering policy.

3. The method of claim 1, wherein the element of tiering storage is an organization element, an upload requirement, or a data retention element.

4. The method of claim 1, wherein the tiering policy comprises a threshold for the data storage attribute, and wherein the data storage attribute is applicable to a file size, a last accessed time, a last attribute changed time or a total storage capacity.

5. The method of claim 1, wherein the determining of the context information comprises employing respective weights associated with different data storage attributes of different workloads analyzed by the system, the different data storage attributes comprising the data storage attribute, and wherein the weights are employed to determine one or more data storage attributes that define the tiering policy.

6. The method of claim 1, further comprising:
   training, by the system, a machine learning model based on historical data representing historical selections of tiering policies for corresponding historical contexts, wherein an output of an analysis of the context information using the machine learning model is employed for the generating the tiering policy setting based on the context information.

7. The method of claim 1, wherein the context information comprises historical context information.

8. The method of claim 1, further comprising:
   repeatedly, by the system, executing the generating and the outputting the tiering policy in response to repeated customer feedback received from the customer via a customer device in response to the outputting the tiering policy.

9. A system, comprising:
   a processor, and a memory that stores executable instructions that, when executed by the processor, facilitate performance of operations, comprising:
      determining, using at least one of an artificial intelligence process or a machine learning process, context information defining a data storage attribute applicable to data at a cloud storage system;
      in response to determining the context information, generating, using the at least one of the artificial intelligence process pr the machine learning process, a tiering policy defining an element of tiering storage of data at the cloud storage system, wherein the tiering policy is based on the data storage attribute defined by the context information; and
      in response to generating the tiering policy, outputting the tiering policy to a storage device associated with a customer;
      wherein the determining the context information comprises generating and analyzing, using the at least one of the artificial intelligence process or the machine learning process, one or more questionnaires or chatbot conversations.

10. The system of claim 9, wherein the operations further comprise:
    in response to customer feedback received via a customer device, modifying, using the at least one of the artificial intelligence process or the machine learning process, the tiering policy.

11. The system of claim 9, wherein the element of tiering storage is an organization element, an upload requirement, or a data retention element.

12. The system of claim 9, wherein the tiering policy comprises a threshold for the data storage attribute, and wherein the data storage attribute is applicable to a file size, a last accessed time, a last attribute changed time or a total storage capacity.

13. The system of claim 9, wherein the determining of the context information comprises employing respective weights associated with different data storage attributes of different workloads analyzed by the at least one of the artificial intelligence process or the machine learning process, the different data storage attributes comprising the data storage attribute, and wherein the weights are employed to determine one or more data storage attributes that define the tiering policy.

14. The system of claim 9, wherein the operations further comprise:
    training a machine learning model based on historical data representing historical selections of tiering policies for corresponding historical contexts,
    wherein an output of an analysis of the context information using the machine learning model is employed for the generating the tiering policy setting based on the context information, and
    wherein the at least one of the artificial intelligence process or the machine learning process employs the machine learning model.

15. The system of claim 9, wherein the context information comprises historical context information.

16. The system of claim 9, wherein the operations further comprise:
    repeatedly executing the generating and the outputting the tiering policy in response to repeated customer feedback received from the customer via a customer device in response to the outputting the tiering policy.

17. The system of claim 9, wherein the questionnaire, or the chat executed by a chatbot, is generated, using the at least one of the artificial intelligence process or the machine learning process, based on requested feedback corresponding to a user entity of the cloud storage system.

18. A non-transitory machine-readable medium, comprising executable instructions that, when executed by a processor facilitate performance of operations, comprising:
    determining context information defining a data storage attribute applicable to data at a cloud storage system;
    in response to determining the context information, generating a tiering policy defining an element of tiering storage of data at the cloud storage system, wherein the tiering policy is based on the data storage attribute defined by the context information; and in response to generating the tiering policy, outputting the tiering policy to a storage device associated with a customer;

wherein the determining the context information comprises generating and analyzing one or more questionnaires or chatbot conversations, and wherein the questionnaire, or chat executed by a chatbot, is generated based on requested feedback from a user entity of the cloud storage system.

* * * * *